United States Patent [19]
Leuschner et al.

[11] Patent Number: 6,133,815
[45] Date of Patent: Oct. 17, 2000

[54] SOLENOID VALVE

[75] Inventors: Werner Leuschner, Hannover; Helmut Latt, Wunstorf; Jan-Peter Ossenbrüegge, Langenhagen, all of Germany

[73] Assignee: Nass Magnet GmbH, Germany

[21] Appl. No.: 09/168,806

[22] Filed: Oct. 8, 1998

[30] Foreign Application Priority Data

Nov. 18, 1997 [DE] Germany .............. 197 51 113

[51] Int. Cl.[7] .................. H01F 3/00; H01F 7/08
[52] U.S. Cl. ................................ 335/262; 335/270
[58] Field of Search .................... 335/236, 255, 335/262, 270

[56] References Cited

U.S. PATENT DOCUMENTS 4,725,802  2/1988  Johnson et al. ................. 335/258

*Primary Examiner*—Michael L. Gellner
*Assistant Examiner*—Raymond Barrera
*Attorney, Agent, or Firm*—Reising, Ethington, Barnes, Kisselle, Learman & McCulloch, P.C.

[57] ABSTRACT

The invention relates to a solenoid valve with a coil body, a magnet core, an armature with armature guide and a yoke. In a first variant there is provided between the yoke and the armature guide a pole tube which has first means for producing an electrical contact with the armature guide and second means for producing an electrical contact with the yoke. In a second variant the solenoid valve also has a fixing plate which is disposed on the side of the solenoid valve on which the armature guide projects out of the yoke, the armature guide projecting through the fixing plate. According to the invention, in this variant a contacting element which produces an electrical contact between the fixing plate and the armature guide is provided between the fixing plate and the armature guide.

8 Claims, 4 Drawing Sheets

SOLENOID VALVE

BACKGROUND OF THE INVENTION

A solenoid valve usually has a coil body, a magnet core, an armature with armature guide and a yoke. Protection classes for electromagnetic devices are defined in DIN VDE 0580. An electromagnetic device in which the protection against dangerous body currents is not based solely on the basic insulation is classified in Protection Class 1. In the DIN specification for this protection class it is stated that the protection in the event of a fault must be provided in such a way that conductive magnet parts which are live in the event of a fault are connected to the protective conductor or to the conductive construction parts which are connected to the protective conductor.

In the known solenoid valves described above, the protective conductor is connected directly to the yoke of the solenoid valve by way of a rivet nut. The armature guide is connected to the yoke by way of the magnet core and a metal lock nut, and a high tightening torque must be ensured for secured contacting. If the fixing is by means of a plastic nut, the pretension due to the flow of the plastic abates with time, so that the connection becomes unreliable.

The object of the invention, therefore, is to fmd a new solution so that magnet parts which become live in the event of a fault are connected to the protective conductor or to the conductive construction parts connected to the protective conductor.

SUMMARY OF THE INVENTION

In the first solution according to the invention the pole tube disposed between the yoke and the armature guide has first means for producing an electrical contact with the armature guide and second means for producing an electrical contact with the yoke. Thus with this construction the currents are transmitted not from the armature guide via the magnet core to the yoke but from the armature guide via the pole tube to the yoke.

In a second construction a fixing plate is provided which is disposed on the side of the solenoid valve on which the armature guide projects out of the yoke. According to the invention a contacting element which produces an electrical contact between the fixing plate and the armature guide is provided between the fixing plate and the armature guide. In this variant the currents are transmitted from the armature guide via the fixing plate to conductive parts connected thereto which are connected to the protective conductor.

Both constructions have the advantage that it is no longer a question of secure contacting between the magnet core and the yoke and thus it is not necessary to set such high standards for the lock nut. Therefore lock nuts made from plastic can also be used.

THE DRAWINGS

The invention will be explained in greater detail below with reference to the description and the drawings, in which:

FIG. 1 shows a sectional representation of the solenoid valve according to a first embodiment, FIG. 2 shows a side view of the pole tube, FIG. 3 shows a plan view of the pole tube, FIG. 4 shows a cut-away detail of the solenoid valve according to a second embodiment, FIG. 5 shows a plan view of the contacting element, and FIG. 6 shows a cut-away side view of the contacting element.

DETAILED DESCRIPTION

Figure 1:
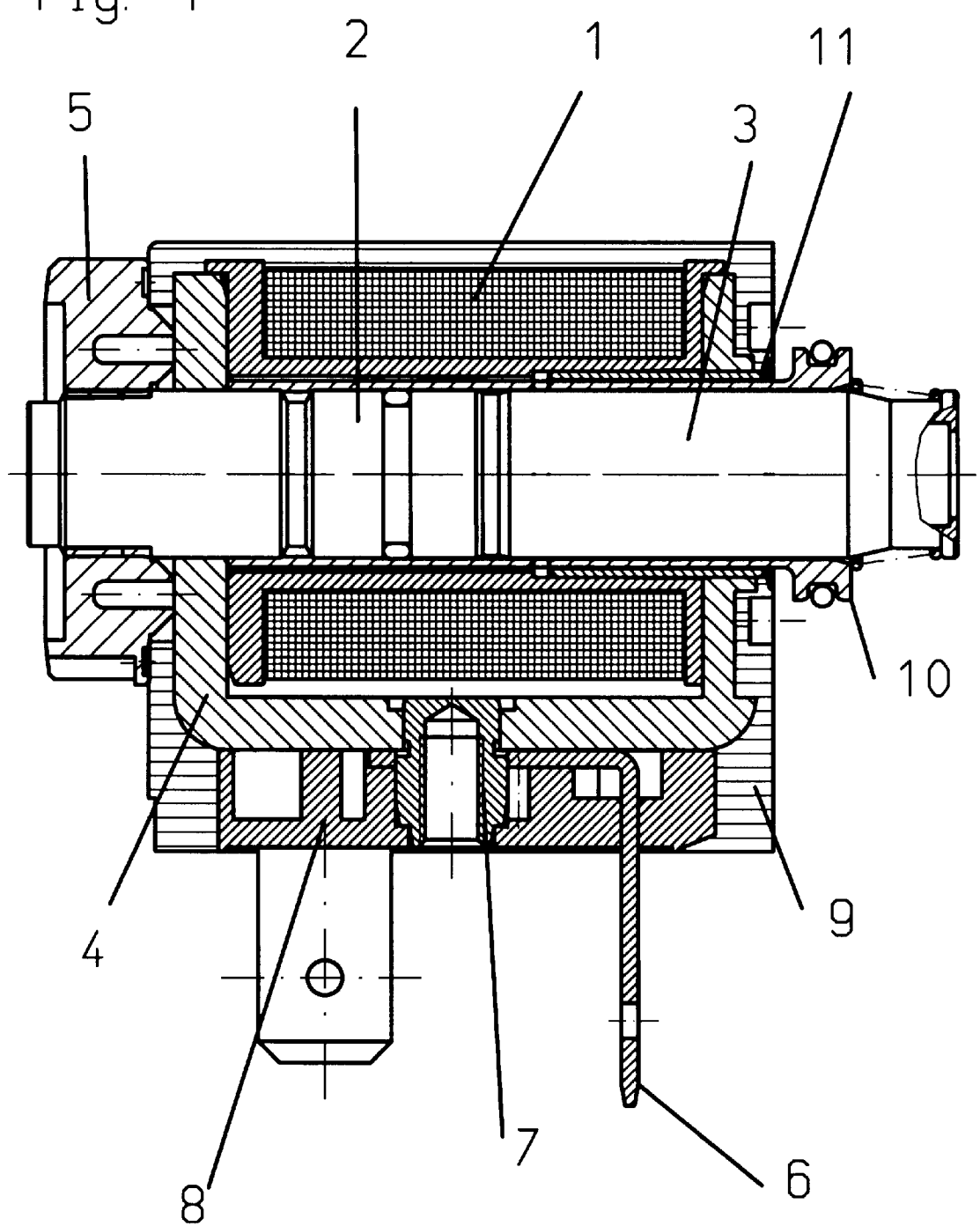

FIG. 1 shows a solenoid valve according to a first embodiment. It consists essentially of a coil body 1, a magnet core 2, an armature 3 and a U-shaped yoke 4 into which the coil body 1 is inserted.

The magnet core 2 is retained with the yoke 4 by way of a lock nut 5. A protective conductor connection 6 is also provided, which is fixed with a rivet nut 7 on the yoke 4. For controlling the solenoid valve a terminal block 8 is also provided which is pushed onto the yoke 4 in the region of the rivet nut 7. The solenoid valve also has a plastic sheath 9.

The armature 3 is guided in a cylindrical armature guide 10 which is pressed together with the magnet core 2. The armature guide 10 is passed through the yoke 4 and projects with one end out of the solenoid valve. This end is then brought into contact with a component which is to be controlled. In order to ensure a good magnetic transfer between the yoke 4 and the magnet core 2, a pole tube 11 is provided which reduces the air gap between the yoke 3 and the armature guide 10. It is preferably made from steel.

According to the invention this pole tube has first means for producing an electrical contact with the armature guide and second means for producing an electrical contact with the yoke.

Figure 2:
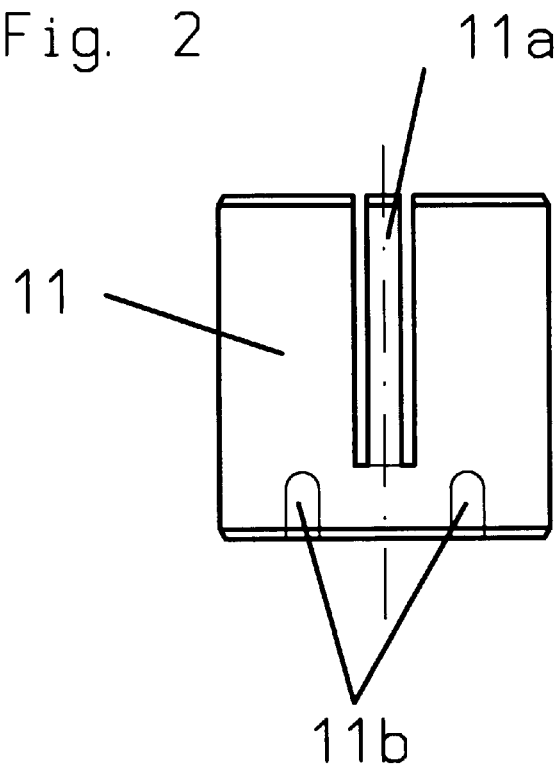
Figure 3:
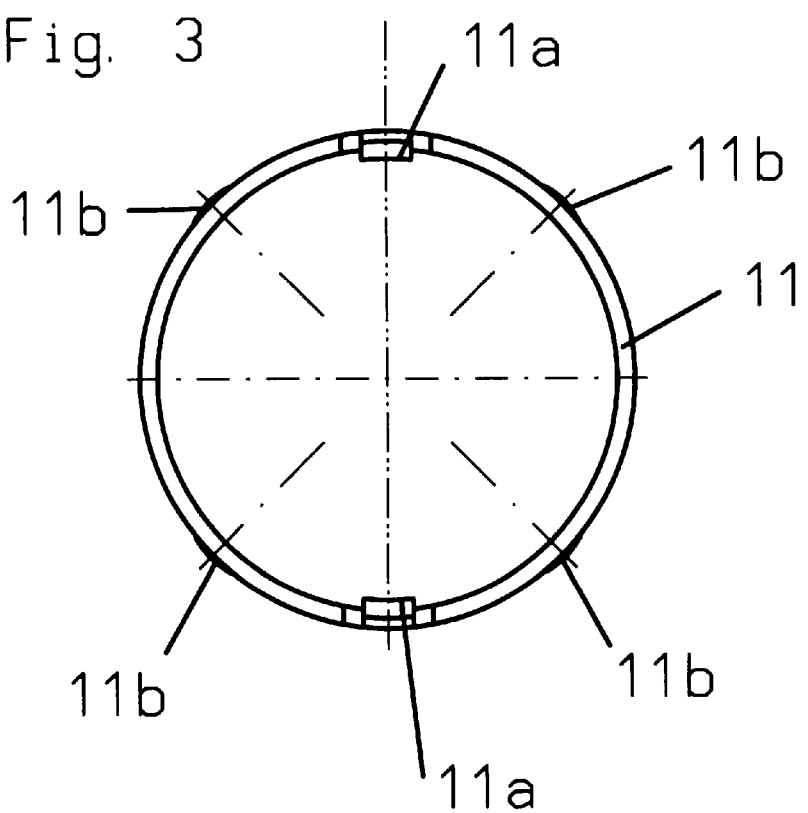

The more detailed construction of the pole tube can be seen from FIGS. 2 and 3. The pole tube is of cylindrical construction and is produced for example from a tubular piece or a rolled metal sheet.

In the illustrated example the first means for producing the electrical contact with the armature guide are formed by two spring arms 11a which are bent inwards. The second means for producing the electrical contact with the yoke are provided here by beads 11b which project outwards so that the pole tube 11 has a somewhat greater diameter in this region.

When the pole tube is installed it comes to a force fit with yoke in the region of the beads 11b. In this case the inwardly bent spring arms 11a come into sufficient contact with the armature guide 10. In this way currents can be led off from the magnet core 2 via the armature guide 10 to the yoke 4 and thus to the protective conductor connection 6.

Naturally, within the scope of the invention other means for producing the electrical contact are also possible. Thus in particular spring arms which are bent outwards could also be provided in this region instead of the beads 11b.

Figure 4:
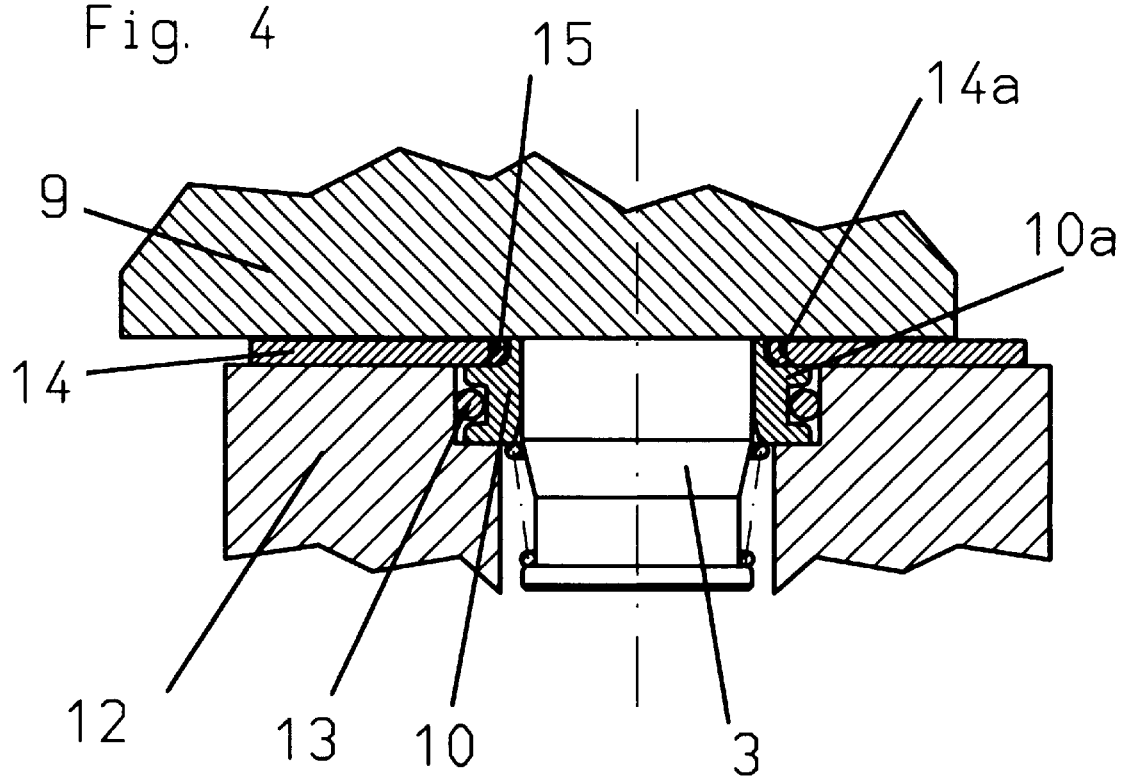

FIG. 4 shows a second embodiment, but only shows a detail in the region of the armature 3 projecting out of the solenoid valve. The solenoid valve is otherwise constructed according to FIG. 1. The pole tube can simply be constructed as required in a conventional manner, i.e. without means for electrical contacting. The solenoid valve illustrated in FIG. 4 is coupled to a component 12 on the side on which the armature 3 projects. In order to ensure a tight closure, a seal 13 is provided between the armature guide 10 and the component 12.

Figure 5:
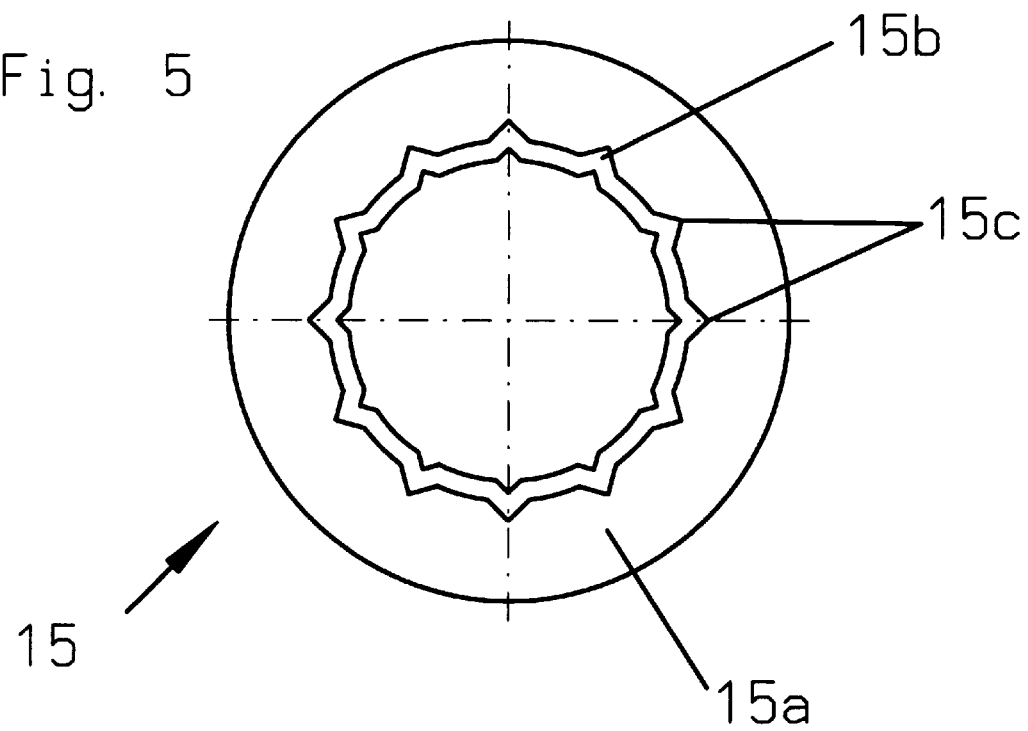
Figure 6:
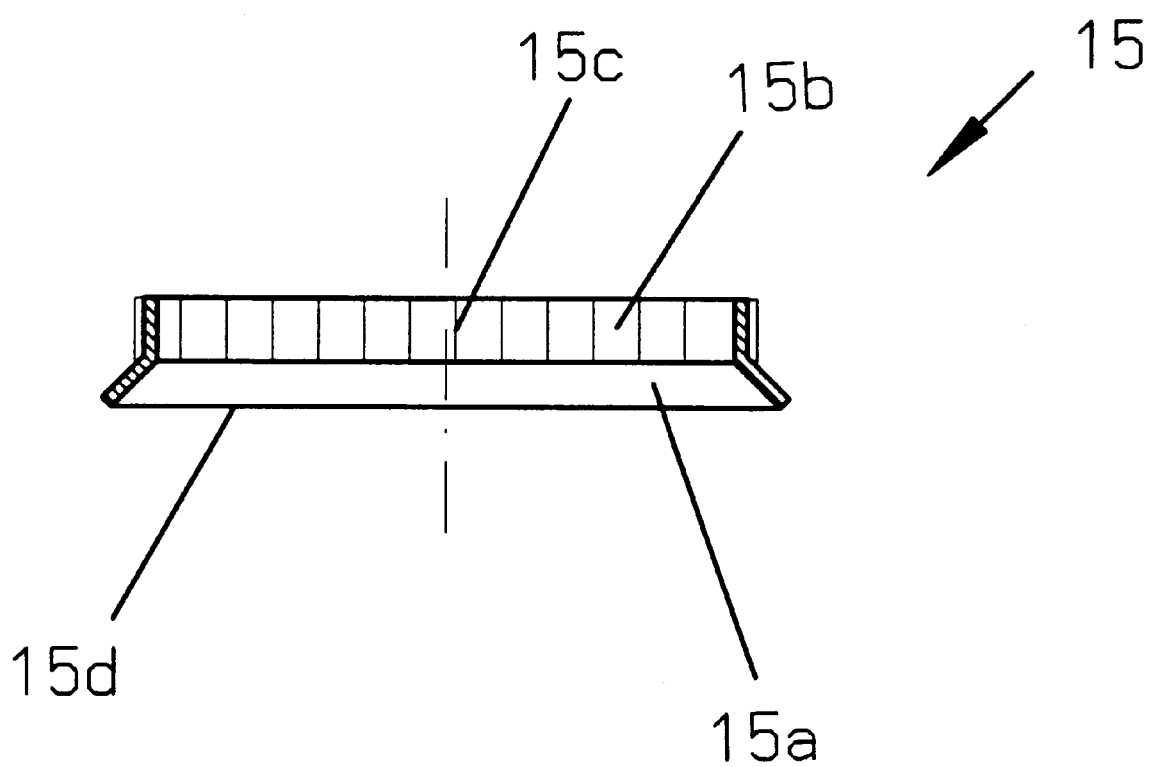

On the side facing the component 12, the solenoid valve has a fixing plate 14 through which the armature guide 10 projects. According to the invention a contacting element 15 which produces an electrical contact between the fixing plate 14 and the armature guide 10 is provided between the fixing plate 14 and the armature guide 10. In this way any currents can be led off from the magnet core via the armature guide 10, the contacting element 15, the fixing plate 14 and the component 12. An example of the contacting element 15 is shown in FIGS. 5 and 6.

The contacting element is preferably of annular and resilient construction in order to produce the best possible electrical contact between the fixing plate 14 and the armature guide 10. The illustrated contacting element 15 consists of a substantially cylindrical part 15a and an adjoining part 15b in the shape of a truncated cone.

The substantially cylindrical part 15a has rib-like convexities 15c on its outer circumference which are distributed approximately regularly and extend in the longitudinal direction. These convexities can be produced for example by corresponding compression stress on the inner face. The fixing plate 14 advantageously has a bore 14a which is slightly smaller in diameter than the diameter of the cylindrical part 15a. Due to the rib-like convexities 15c a force fit of the contacting element 15 in the bore 14a of the fixing plate 14 can be produced in this way.

The part 15b in the shape of a truncated cone forms the resilient part of the contacting element 15. The contacting element 15 has a lower edge 15d with which it rests on a flange-like enlargement 10a of the armature guide and thus produces the electrical contact.

Both the special construction of the pole tube and the provision of the contacting element 15 constitute two possibilities, which are independent of one another, for ensuring protection in the event of a fault. Naturally, within the scope of the invention both variants can also be provided in one solenoid valve.

What is claimed is:

1. In a solenoid valve having a coil body, a magnet core, an armature, an armature guide, a yoke, and a pole tube disposed between the yoke and the armature guide, the improvement comprising first and second means on said pole tube for producing an electrical contact with the armature guide and with the yoke, respectively, one of the first and second means comprising at least one bent spring arm.

2. The valve according to claim 1 wherein the pole tube is tubular and the first and second means for producing the respective electrical contacts are integral with the pole tube.

3. The valve according to claim 2 wherein the other of the first and second means comprises at least one bent spring arm.

4. The valve according to claim 1 wherein the other of the first and second means is formed by beads.

5. The valve according to claim 2 wherein the other of the first and second means is formed by beads.

6. The valve according to any one of claims 1–2, 3–5 wherein the first means comprises at least two bent spring arms.

7. The valve according to any one of claims 1–2, 4–5 wherein the second means comprises beads which project outwards.

8. In a solenoid valve having a coil body, a magnet core, an armature, an armature guide, a yoke, and a pole tube disposed between the yoke and the armature guide, the improvement comprising first and second means on said pole tube for producing an electrical contact with the armature guide and with the yoke, respectively, one of the first and second means being formed by beads.

* * * * *